United States Patent
Murphy et al.

(10) Patent No.: US 7,647,578 B2
(45) Date of Patent: Jan. 12, 2010

(54) PROGRAMMATIC CREATION AND MANAGEMENT OF TASKS IN A GRAPHICAL PROGRAM

(75) Inventors: Louis R. Murphy, Round Rock, TX (US); Stephen C. Thorne, Austin, TX (US); Deborah E. Bryant, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1061 days.

(21) Appl. No.: 10/438,781

(22) Filed: May 15, 2003

(65) Prior Publication Data

US 2004/0230944 A1   Nov. 18, 2004

(51) Int. Cl.
  G06F 9/44       (2006.01)
  G06F 3/048      (2006.01)
(52) U.S. Cl. .............. 717/109; 717/105; 717/113; 717/106; 717/108; 717/114; 715/763
(58) Field of Classification Search ......... 717/109–141, 717/100, 105; 702/123; 345/703–771; 715/105, 715/763, 771, 703, 835
See application file for complete search history.

(56) References Cited

U.S. PATENT DOCUMENTS

| | | | |
|---|---|---|---|
| 6,064,812 A * | 5/2000 | Parthasarathy et al. ...... 717/105 |
| 6,437,805 B1 * | 8/2002 | Sojoodi et al. .............. 715/763 |
| 6,802,053 B1 * | 10/2004 | Dye et al. .................... 717/113 |
| 7,162,387 B2 * | 1/2007 | Johnson et al. ............. 702/123 |
| 2001/0034879 A1 * | 10/2001 | Washington et al. ........... 717/1 |
| 2002/0196283 A1 * | 12/2002 | Petruk et al. ................. 345/763 |
| 2002/0199168 A1 * | 12/2002 | Namito ........................ 717/107 |
| 2003/0001896 A1 * | 1/2003 | Johnson et al. ............. 345/771 |
| 2003/0004670 A1 | 1/2003 | Schmit et al. |
| 2003/0234802 A1 * | 12/2003 | Makowski et al. .......... 345/703 |
| 2004/0034847 A1 * | 2/2004 | Joffrain et al. .............. 717/113 |
| 2004/0158812 A1 * | 8/2004 | Dye et al. .................... 717/105 |

* cited by examiner

*Primary Examiner*—Insun Kang
(74) *Attorney, Agent, or Firm*—Meyertons Hood Kivlin Kowert & Goetzel, P.C.; Jeffrey C. Hood; Mark S. Williams

(57) ABSTRACT

System and method for programmatic creation of a task specification in a graphical program. A graphical program is programmatically analyzed. The graphical program implements a task, and includes a plurality of interconnected nodes that visually indicate functionality of the graphical program, including a function node that requires a task specification as input. The task specification includes hardware and/or software specifications for performing the task. The task specification is programmatically generated in response to the analyzing, and programmatically provided to the function node as input, where the function node operates to execute in accordance with the generated task specification to perform at least a portion of the task. The analyzing, generating, and providing are performed at run-time of the graphical program, e.g., during execution of the graphical program, and may be invoked or performed by a graphical program execution system, by a node in the graphical program, or both.

24 Claims, 8 Drawing Sheets

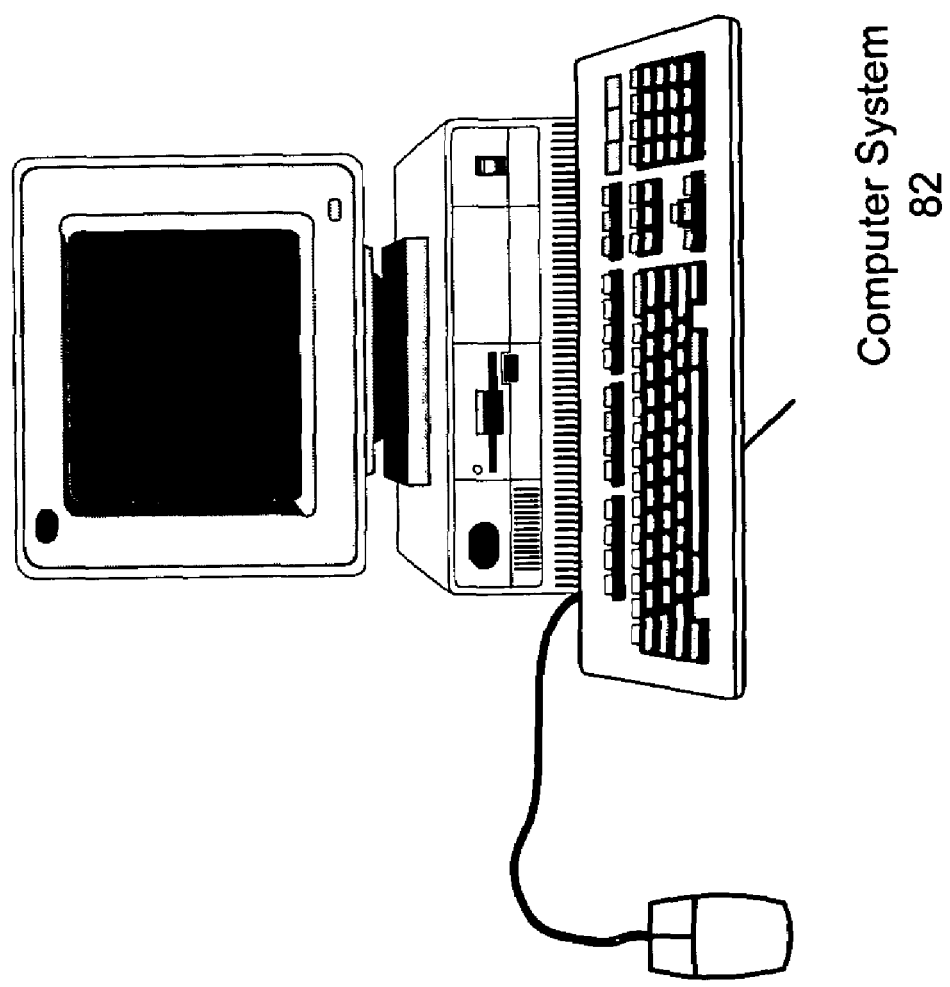

PROGRAMMATIC CREATION AND MANAGEMENT OF TASKS IN A GRAPHICAL PROGRAM

FIELD OF THE INVENTION

The present invention relates to the field of graphical programming, and more particularly to a system and method for programmatically creating and managing tasks in a graphical program.

DESCRIPTION OF THE RELATED ART

Traditionally, high level text-based programming languages have been used by programmers in writing application programs. Many different high level text-based programming languages exist, including BASIC, C, Java™, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various nodes, e.g., icons such as function nodes, terminals nodes, structure nodes, etc., which represent desired functionality, and then connecting the nodes together to create the program. The nodes may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW™ product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In parallel with the development of the graphical programming model, increasingly powerful tools have been developed to facilitate the creation, management, and execution of graphical programs to perform specified functions. For example, channel and task specification tools have been developed that receive user input specifying attributes of a channel or task and generate a corresponding channel or task specification in response to the user input. The channel or task specification may then be provided as input to a graphical program node in a graphical program, e.g., to a data acquisition read or write node.

However, prior art approaches have typically required the developer of the graphical program to explicitly specify or manage the creation and management of task specifications, and/or clean-up operations after the specified task has been performed, e.g., by placement of appropriate graphical program nodes in the graphical program for creating and/or retrieving the task specification. If the user fails to provide such explicit program elements or fails to use them appropriately, the resulting graphical program may not operate as intended, or may not operate at all.

Thus, improved systems and methods are desired for creation and management of tasks, e.g., measurement, control, automation, and simulation tasks, among others.

SUMMARY OF THE INVENTION

One embodiment of the present invention comprises a system and method for programmatically creating and managing a task, or more specifically, a task specification, during execution of a graphical program where the graphical program implements a task. Note that in the systems and methods described herein, all I/O is performed in the context of a task, where the task is the functionality implemented by the graphical program, and where the task is described or specified by a task specification, as described below. It should be noted that the task to be performed by the graphical program may include any type of functionality desired, including, for example, an industrial automation function, a process control function, a test and measurement function, and/or a simulation function, among others. The graphical program may operate to perform the task in conjunction with one or more devices, e.g., DAQ (Data Acquisition) devices, motion controllers, etc.

In one embodiment, the graphical program may be created on a first computer system (or on a second, different, computer system). The graphical program may be created or assembled by the user arranging on a display a plurality of nodes, e.g., function nodes, terminal nodes, etc., and then interconnecting the nodes to create the graphical program. In response to the user assembling the graphical program, data structures may be created and stored which represent the graphical program. The nodes may be interconnected in one or more of a data flow, control flow, or execution flow format. In other words, in various embodiments, the graphical program may comprise a graphical data flow program, a graphical control flow program, and/or a graphical execution flow program. The graphical program may thus comprise a plurality of interconnected nodes, e.g., function nodes, terminal nodes, structure nodes, etc., which visually indicates the functionality of the program.

The graphical program may comprise a block diagram and may also include a user interface portion or front panel portion. Where the graphical program includes a user interface portion, the user may optionally assemble the user interface on the display. As one example, the user may use the LabVIEW graphical programming development environment provided by National Instruments Corporation to create the graphical program.

In an alternate embodiment, the graphical program may be created by the user creating or specifying a prototype, followed by automatic or programmatic creation of the graphical program from the prototype. The graphical program may also be created in other manners, either by the user or programmatically, as desired.

In one embodiment of the present invention, the graphical program may first be programmatically analyzed, e.g., to determine whether a task specification needs to be created. As noted above, the graphical program preferably includes a plurality of interconnected nodes that visually indicate functionality of the graphical program. In a preferred embodiment, the plurality of nodes includes a function node that requires a task specification as input, where the task specification includes hardware and/or software specifications for performing the task.

For example, in one embodiment, the function node may be a read node for acquiring data from an external system or process. In this case, the function node may require a task specification that includes configuration data regarding channel configuration, timing (e.g., sampling attributes) and triggering, among other configuration data. In another embodiment, the function node may be a write node for writing data to the external system or process, in which case the function node may require a task specification that includes configuration data regarding channel configuration, as well as timing and triggering specifications for writing data, i.e., sending a signal, to the system or process. Of course, these examples are exemplary only, and are not intended to limit the functionality of the function node to any particular form or function. Additionally, in other embodiments, more than one function node may be included in the graphical program, where each function node operates to perform a respective function.

In one embodiment, analyzing the graphical program may include determining that the function node requires a task specification as input, and determining that the graphical program does not currently include means for providing the task specification. For example, in some graphical programs, an explicit "task creation node" may be included that operates to create and provide the task specification for use by one or more other nodes in the program, e.g., a function node, that requires the task specification as input. However, some graphical programs may not include such a task creation node (or its functional equivalent), and so this situation may be discovered or determined through the analysis.

Then, the task specification may be programmatically generated in response to the above analysis. In other words, in response to determining that the function node requires the task specification as input and that means for providing the task specification are not included in the graphical program, the method may programmatically generate the task specification. In one embodiment, the task specification may include default timing and/or triggering attributes for performing the task, e.g., acquire one sample, immediately, with no triggering. In one embodiment, the task specification includes a data structure that stores the hardware and/or software specifications for the task, including, for example, channel configuration data, as well as timing and triggering specifications.

Finally, the generated task specification may be provided to the function node programmatically as input, where the function node is operable to execute in accordance with the generated task specification to perform at least a portion of the task.

In a preferred embodiment, the analyzing, generating, and providing described above are performed at run-time of the graphical program. In other words, the graphical program may be executed, e.g., by a graphical program execution system, to perform the task in accordance with the generated task specification, where the analyzing, generating, and providing are performed during the program execution, e.g., by the graphical program execution system, or by a node in the graphical program.

In one embodiment, one or more cleanup operations may be programmatically performed upon completion of the task. For example, the one or more cleanup operations may include one or more of: closing one or more files used in performing the task, deleting one or more files used in performing the task, deleting one or more data structures used in performing the task, re-configuring hardware used in performing the task, and re-configuring software used in performing the task, among others. Thus, in correspondence with the implicit generation of the task specification, implicit post-task operations may also be performed programmatically.

As noted above, in some embodiments, the graphical program may include a block diagram portion and a user interface portion. In one embodiment, during execution of the graphical program, the graphical user interface may be displayed on a display of a first computer system and the block diagram may execute on a second computer system.

Thus, in various embodiments, the method may, at run-time, programmatically determine that a task specification is required by a node in the graphical program, and may operate to generate the required task specification, and to provide the generated task specification to the node.

The process of creating a task specification is thus an implicit operation that the method performs for the user. For example, in one embodiment, the plurality of interconnected nodes of the graphical program includes a channel creation node (or its equivalent) operable to generate a channel specification for a physical channel, where the channel specification is operable to configure a physical channel of a device for use in performing the task. In generating the channel specification, the channel creation node may be operable to receive input indicating the physical channel of the device. Similarly, in one embodiment, in generating the channel specification, the channel creation node may be operable to receive input indicating a channel name for the channel specification. In a preferred embodiment, in generating a channel specification, the channel creation node may be further operable to programmatically generate the task specification and provide the task specification to the function node, where the task specification includes the channel specification.

In an alternate embodiment, the task specification may be generated via a different approach using a form of data type promotion. For example, in one embodiment, a global virtual channel, e.g., a voltage channel, may be configured, for example using a configuration tool such as DAQ Assistant provided by National Instruments Corporation. The virtual channel (actually, a channel specification) may then be used in LabVIEW as if it were a task (specification). In this example, the graphical program includes a first node, referred to as a channel name control, coupled to a read function node. In one embodiment, the first node is operable to provide a channel specification to the function node as input. For example, in one embodiment, the first node includes a reference to the channel specification, whereby the channel specification may be retrieved for use by other nodes, e.g., the function node.

However, as noted above, the function node requires a task specification as input. Thus, in one embodiment, the above analysis may determine that a data type mismatch occurs between the output of the channel name control (data type: channel specification) and the input of the function node (data type: task specification). In one embodiment, the above task specification generation may be performed by programmatically "promoting" the channel specification to a task specification, where the task specification includes the channel specification. In other words, analogous to other standard data type promotions, such as integer-to-double, float-to-double, etc., as is well known in the art of programming and data processing, the data type "channel specification" may be promoted to the data type "task specification", thereby converting the channel specification to a corresponding task specification, where, as noted above, the task specification includes the channel specification. Thus, by converting or promoting the channel specification to a task specification, the task specification is created implicitly.

In the embodiment described above, the analyzing, generating, and providing are invoked or performed by the graphical program execution system, although in various embodiments, the analyzing, generating, and providing may be invoked or performed by the graphical program execution system, and/or by one (or more) of the plurality of nodes comprised in the graphical program. Thus, in various embodiments, this programmatic creation of the task specification via promotion or conversion, (including the determination of the need to perform the promotion or conversion) may be performed by the graphical program execution system (i.e., by infrastructure code), by program code included or associated with one or more of the nodes, i.e., the function node or the channel name control, or by a combination of the two.

Thus, in one embodiment, the plurality of interconnected nodes of the graphical program includes a channel name control (or its equivalent), where the channel name control includes a reference to a channel specification, and where the channel specification includes channel configuration data for configuring a physical channel of a device for use in performing the task, and where the channel name control may be operable to provide the channel specification to the function node as input. In generating the task specification in response to the analyzing, the channel specification may be programmatically converted to the task specification, where the task specification includes the channel specification.

It should be noted that the implicit task creation, e.g., via data type promotion, may be associated with various types of nodes, including, for example, a channel name control. In an alternate embodiment, a "timing and triggering" node may provide a timing and triggering specification as output. In this embodiment, the timing and triggering specification may be promoted or converted to a task specification, where the task specification includes the timing and triggering specification. Thus, in a broad sense, the system and method may operate to implicitly generate the task specification by promoting or converting a different data type or structure, e.g., a channel specification, or other type of specification, to the task specification.

Thus, in preferred embodiments of the inventions, inclusion of an explicit task specification creation node in the graphical program may not be required because the task specification is created implicitly.

BRIEF DESCRIPTION OF THE DRAWINGS

A better understanding of the present invention can be obtained when the following detailed description of the preferred embodiment is considered in conjunction with the following drawings, in which:

FIG. 1 illustrates a computer system operable to execute a graphical program according to an embodiment of the present invention;

Figure 1A:
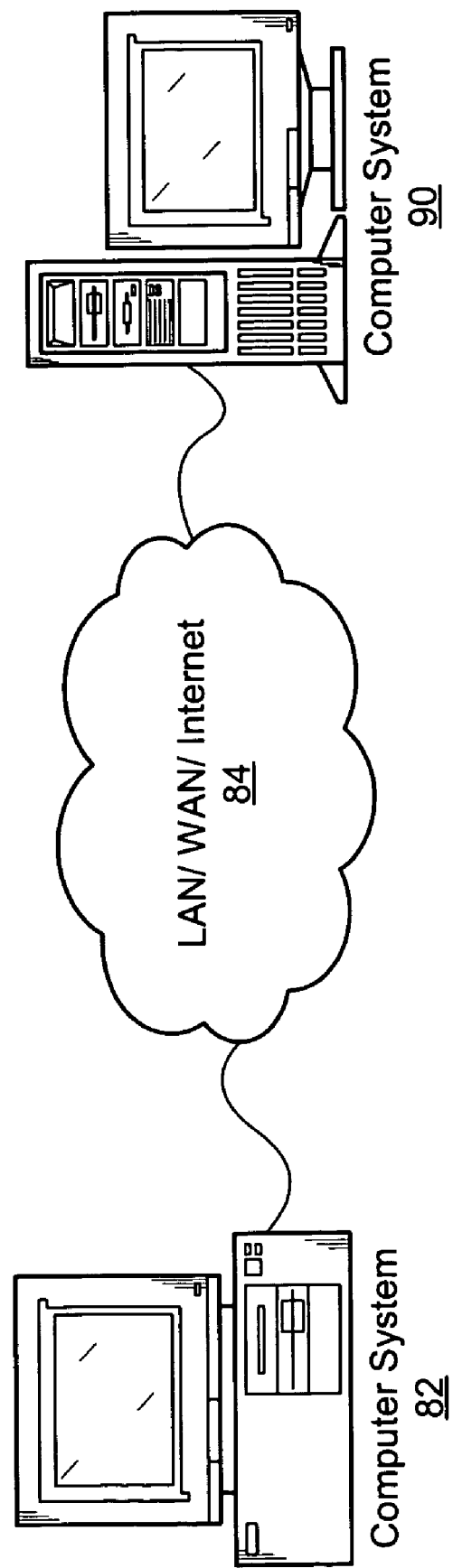
FIG. 1A illustrates a network system comprising two or more computer systems that may implement an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Publication No. 20010020291 (Ser. No. 09/745,023) titled "System and Method for Programmatically Generating a Graphical Program in Response to Program Information," filed Dec. 20, 2000.

U.S. patent application Ser. No. 10/008,792 titled "Measurement System Software Architecture for Easily Creating High-Performance Measurement Applications," filed Nov. 13, 2001.

U.S. patent application Ser. No. 10/008,792 titled "Measurement System Graphical User Interface for Easily Configuring Measurement Applications," filed Apr. 24, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program, development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more data acquisition (DAQ) or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Computer System

FIG. 1 illustrates a computer system 82 operable to store and execute program instructions for programmatically creating and managing a task specification during execution of a graphical program. One embodiment of a method for programmatically creating and managing a task specification during execution of a graphical program, i.e., at run-time, is described below.

As shown in FIG. 1, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., text based or graphical programs, which are executable to perform the methods described herein. Also, the memory medium may store a graphical programming development environment application used to create and/or execute graphical programs according to various embodiments of the present invention. The memory medium may also store operating system software, as well as other software for operation of the computer system. Various embodiments further include receiving or storing instructions and/or data implemented in accordance with the foregoing description upon a carrier medium.

FIG. 1A—Computer Network

FIG. 1A illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as measurement devices, multimedia devices, video devices, audio devices, telephony devices, Internet devices, etc., as well as general purpose software applications such as word processing, spreadsheets, network control, network monitoring, financial applications, games, etc.

Figure 2A:
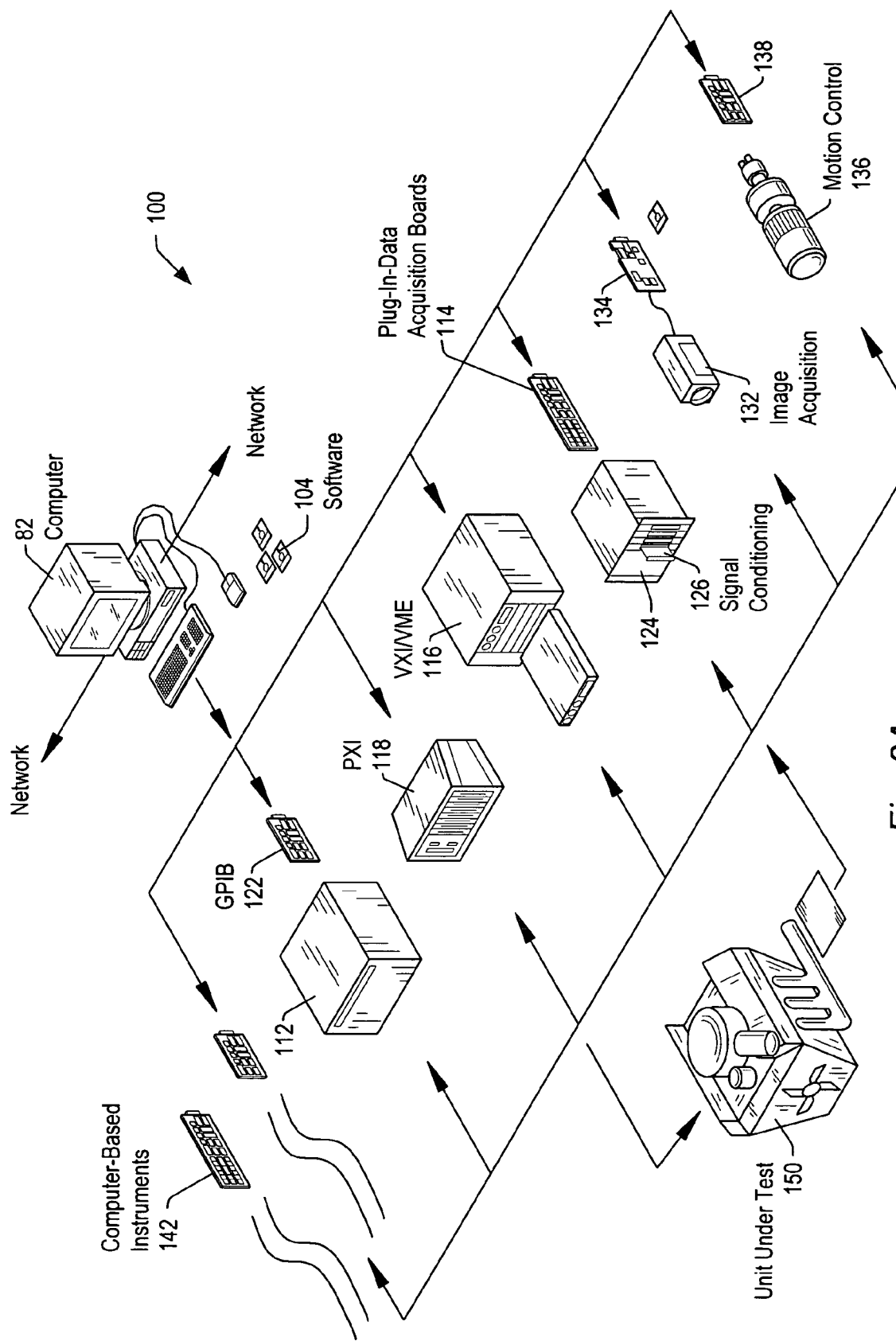
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (WUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
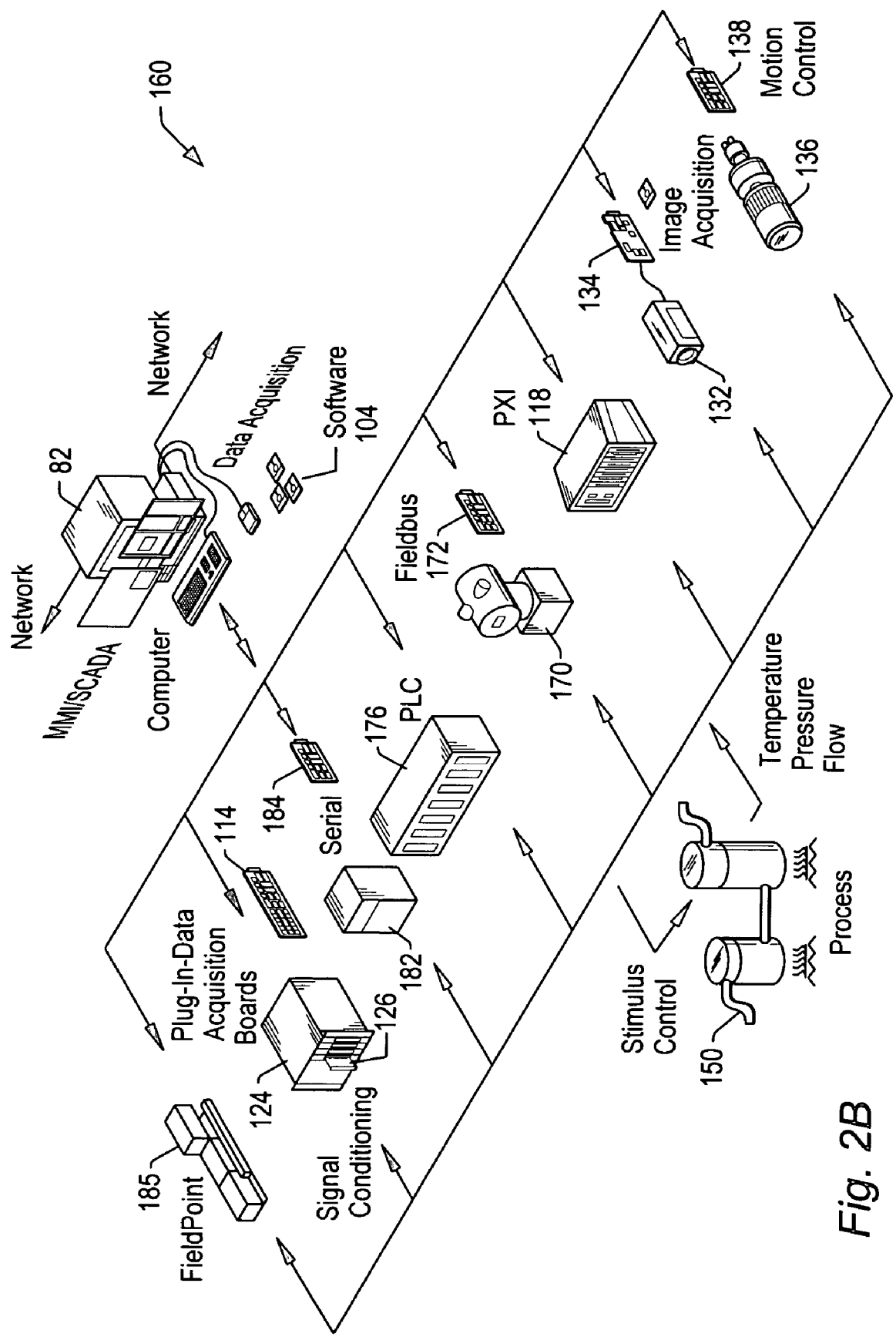
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3:
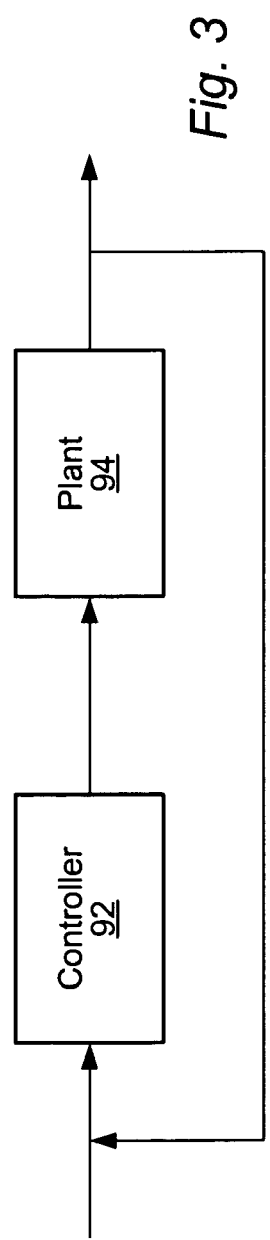
FIG. 3 is a high level block diagram of an exemplary system which may execute or utilize graphical programs.

FIG. 3 is a high level block diagram of an exemplary system which may execute or utilize graphical programs. FIG. 3 illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3A:
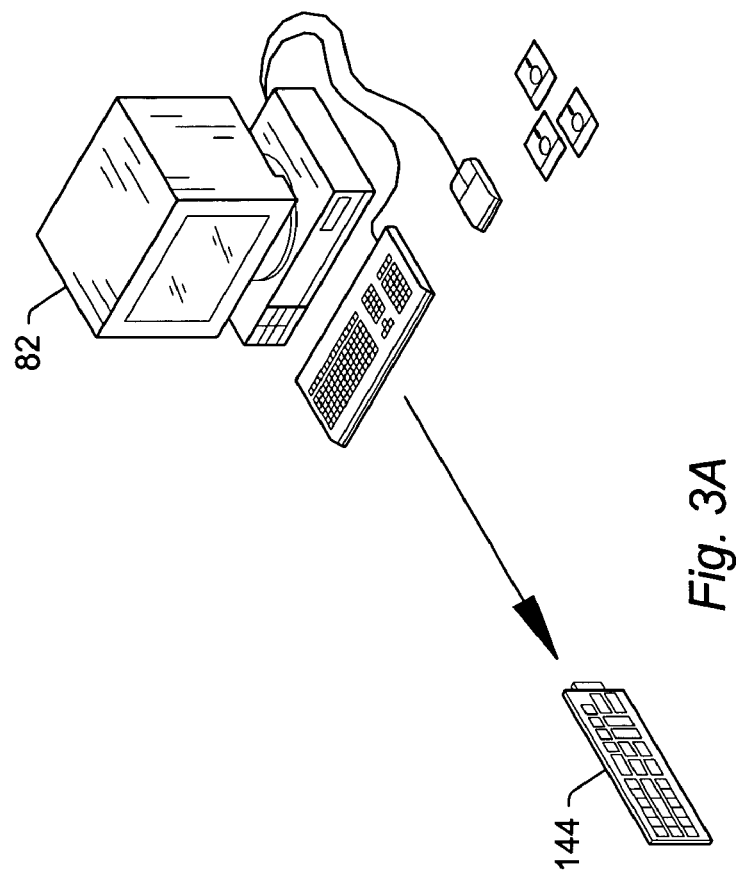
FIG. 3A illustrates an exemplary system which may perform control and/or simulation functions utilizing graphical programs.

FIG. 3A illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a RTOS, or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3A above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A, 2B, and 2C, may be referred to as virtual instruments (VIs).

Figure 4:
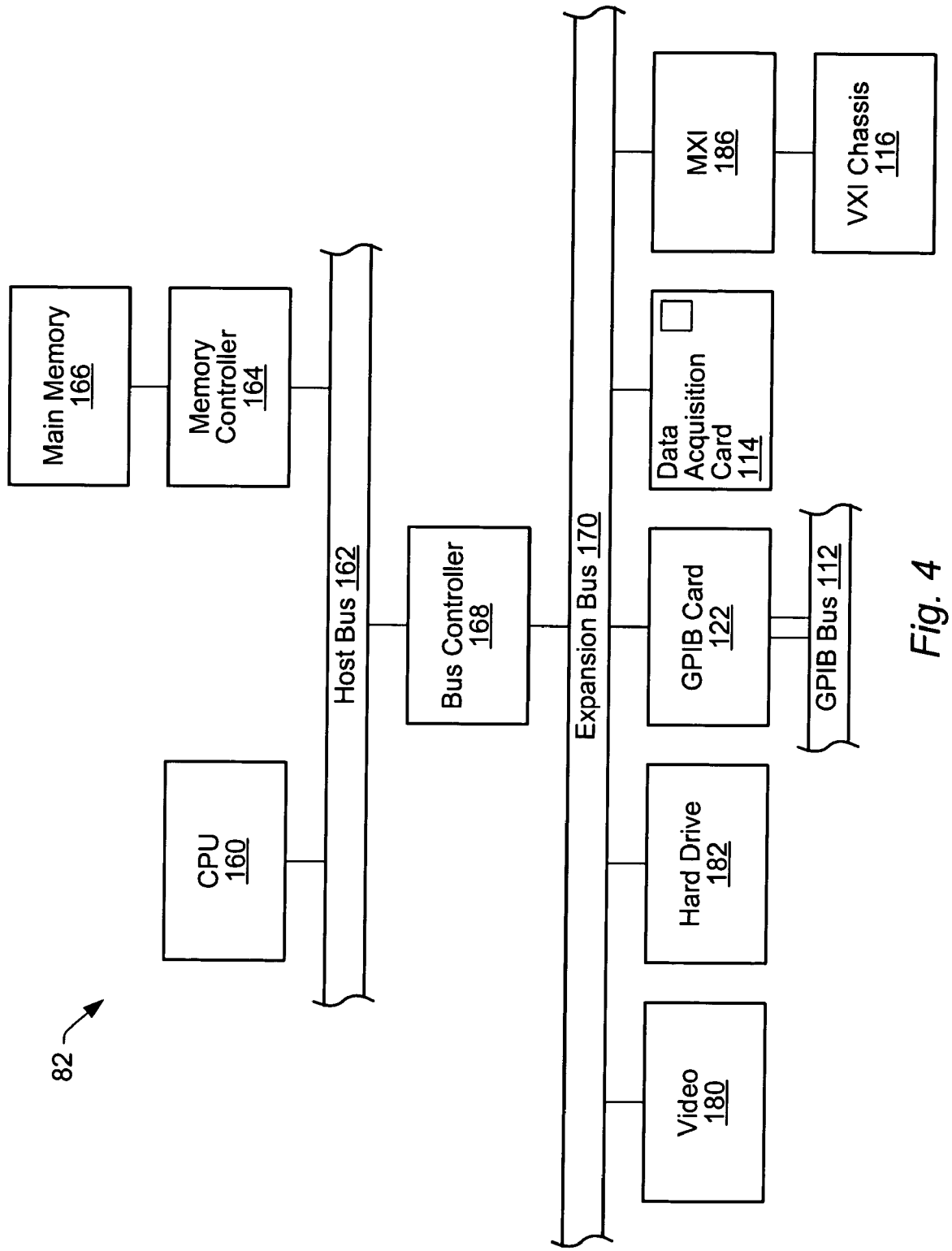
FIG. 4 is an exemplary block diagram of the computer systems of FIGS. 1, 1A, 2A and 2B and 3A.

FIG. 4—Computer System Block Diagram

FIG. 4 is a block diagram representing one embodiment of the computer system 82 and/or 90 illustrated in FIGS. 1 and 1A, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store program instructions for programmatically creating and managing a task specification during execution of a graphical program, as well as one or more graphical programs according to various embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, various devices may also be connected to the computer. For example, as FIG. 4 shows, exemplary devices may include one or more of a video adaptor 180, a hard drive 182, a bus card, such as a GPIB card 122 and GPIB bus 112, a DAQ card 114, and an MXI card 186 coupled to a VXI chassis 116, among others. In one embodiment, a device coupled to the computer may include a processor and memory which may execute a real time operating system. The device may also or instead comprise a programmable hardware element. The computer system may be operable to deploy a graphical program to the device for execution of the graphical program on the device. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code that has generated from either the graphical program or from text code that in turn was generated from the graphical program.

Figure 5:
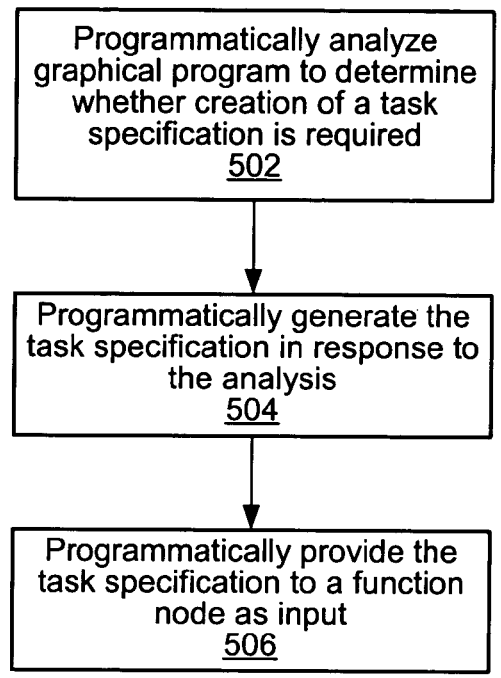
FIG. 5 is a high level flowchart diagram illustrating one embodiment of a method for programmatically creating and managing tasks in a graphical program.

FIG. 5—Programmatically Creating and Managing a Task in a Graphical Program

FIG. 5 is a high level flowchart of a method for programmatically creating and managing a task, or more specifically, a task specification, during execution of a graphical program where the graphical program implements a task. Note that in the systems and methods described herein, all I/O is performed in the context of a task, where the task is the functionality implemented by the graphical program, and where the task is described or specified by a task specification, as described below.

In one embodiment, the graphical program may be created on the computer system 82 (or on a different computer system). The graphical program may be created or assembled by the user arranging on a display a plurality of nodes, e.g., function nodes, terminal nodes, etc., and then interconnecting the nodes to create the graphical program. In response to the user assembling the graphical program, data structures may be created and stored which represent the graphical program. The nodes may be interconnected in one or more of a data flow, control flow, or execution flow format. In other words, in various embodiments, the graphical program may comprise a graphical data flow program, a graphical control flow program, and/or a graphical execution flow program. The graphical program may thus comprise a plurality of interconnected nodes, e.g., function nodes, terminal nodes, structure nodes, etc., which visually indicates the functionality of the program.

As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. Examples of graphical programs according to various embodiments of the present invention are presented below with reference to FIGS. 6A, 6B and 7.

In various embodiments, one or more of the steps described may be performed concurrently, in a different order than shown, or omitted. Additional steps may also be performed as desired. The method shown in FIG. 5 may be used in conjunction with any of the computer systems or devices shown in the above Figures, among other devices. As shown, this method may operate as follows.

First, in step 502 the graphical program may be programmatically analyzed, e.g., to determine whether a task specification needs to be created. As noted above, the graphical program preferably includes a plurality of interconnected nodes that visually indicate functionality of the graphical program. In a preferred embodiment, the plurality of nodes includes a function node that requires a task specification as input, where the task specification includes hardware and/or software specifications for performing the task.

For example, in one embodiment, the function node may be a read node for acquiring data from an external system or process. In this case, the function node may require a task specification that includes configuration data regarding channel configuration, timing (e.g., sampling attributes) and triggering, among other configuration data. In another embodiment, the function node may be a write node for writing data to the external system or process, in which case the function node may require a task specification that includes configuration data regarding channel configuration, as well as timing and triggering specifications for writing data, i.e., sending a signal, to the system or process. Of course, these examples are exemplary only, and are not intended to limit the functionality of the function node to any particular form or function. Additionally, in other embodiments, more than one function node may be included in the graphical program, where each function node operates to perform a respective function.

In one embodiment, analyzing the graphical program may include determining that the function node requires a task specification as input, and determining that the graphical program does not currently include means for providing the task specification. For example, as may be seen below with reference to FIG. 6B, in some graphical programs, an explicit "task creation node" may be included that operates to create and provide the task specification for use by one or more other nodes in the program, e.g., a function node, that requires the task specification as input. However, some graphical programs may not include such a task creation node (or its functional equivalent), and so this situation may be discovered or determined through the analysis.

Then, as indicated in 504, the task specification may be programmatically generated in response to the analysis of 502. In other words, in response to determining that the function node requires the task specification as input and that means for providing the task specification are not included in the graphical program, the method may programmatically generate the task specification. In one embodiment, task specification may include default timing and/or triggering attributes for performing the task, e.g., acquire one sample, immediately, with no triggering. In one embodiment, the task specification includes a data structure that stores the hardware and/or software specifications for the task, including, for example, channel configuration data, as well as timing and triggering specifications.

Finally, in 506, the generated task specification may be provided to the function node programmatically as input, where the function node is operable to execute in accordance with the generated task specification to perform at least a portion of the task.

In a preferred embodiment, the analyzing, generating, and providing described above are performed at run-time of the graphical program. In other words, the graphical program may be executed, e.g., by a graphical program execution system, to perform the task in accordance with the generated task specification, where the analyzing, generating, and providing are performed during the program execution, e.g., by the graphical program execution system, or by a node in the graphical program.

Examples of graphical programs illustrating use of the method described above are presented in FIGS. 6A-7, and described below.

In one embodiment, one or more cleanup operations may be programmatically performed upon completion of the task. For example, the one or more cleanup operations may include one or more of: closing one or more files used in performing the task, deleting one or more files used in performing the task, deleting one or more data structures used in performing the task, re-configuring hardware used in performing the task, and re-configuring software used in performing the task, among others. Thus, in correspondence with the implicit generation of the task specification, implicit post-task operations may also be performed programmatically.

As noted above, in some embodiments, the graphical program may include a block diagram portion and a user interface portion. In one embodiment, during execution of the graphical program, the graphical user interface may be displayed on a display of a first computer system and the block diagram may execute on a second computer system.

Thus, in one embodiment, the method may, at run-time, programmatically determine that a task specification is required by a node in the graphical program, and may operate to generate the required task specification, and to provide the generated task specification to the node, which may then execute in accordance with the task specification.

Figure 6A:
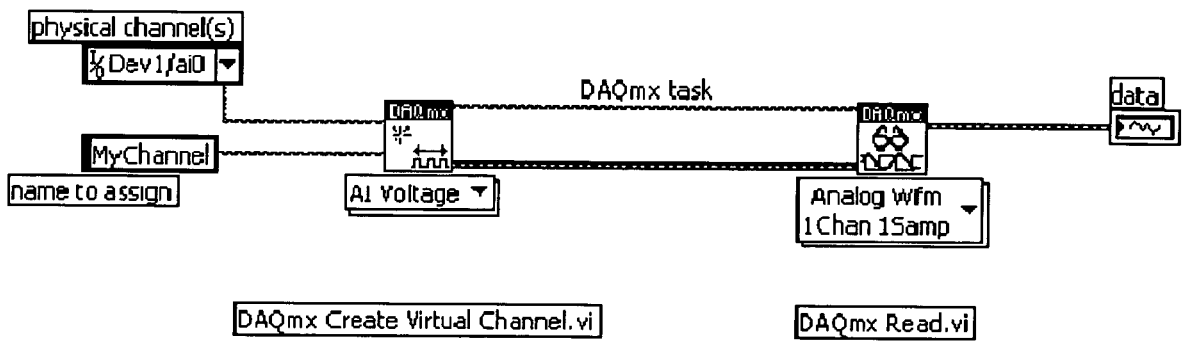
FIGS. 6A and 6B present example graphical programs comparing and illustrating aspects of one embodiment of the present invention.
Figure 6B:
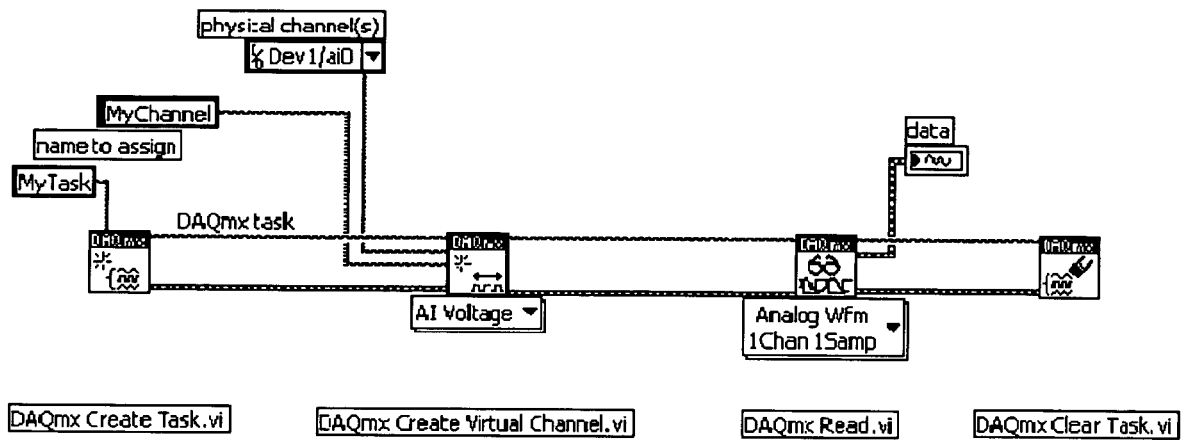
Figure 7:
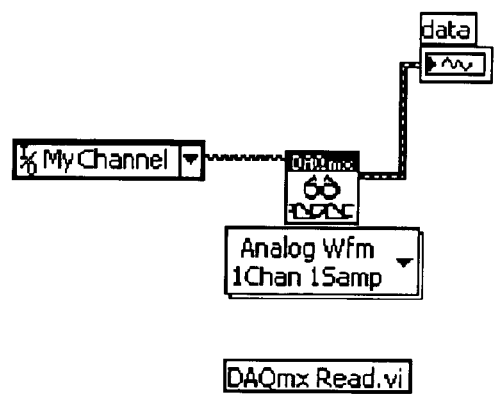
FIG. 7 illustrates a graphical program wherein the task specification is created by implicit promotion of a data type, according to one embodiment.

FIGS. 6A-7—Example Graphical Programs Illustrating Use of the Method of FIG. 5

There are a number of different ways that the above method may be implemented and used, as illustrated in FIGS. 6A-7, and described below. More specifically, FIGS. 6A-7 illustrate embodiments of graphical programs where a task specification, required as input by a graphical program node, is generated implicitly and provided to the node. The graphical programs shown are block diagrams, also referred to as data flow diagrams, developed in the LabVIEW graphical program development environment, as provided by National Instruments Corporation, although other development environments or systems may be used as desired. It is noted that the graphical programs shown are meant to be exemplary only, and are not intended to limit the application of the methods described herein to any particular form or function.

FIG. 6A is an example of a simple DAQ application. In this example, a first node labeled "DAQmx Create Virtual Channel.vi", and referred to as a channel creation node, is used to configure a voltage measurement on a first analog input channel (ai0) of a first device (Dev1), i.e., the first node operates to create a channel specification which may be used to configure the channel. As FIG. 6A shows, the input channel is assigned the name "MyChannel". A second node, a function node labeled "DAQmx Read.vi", is used to actually acquire a data point from the voltage channel that has been configured. Note that the read node shown is but one example of a function node, and that any other type of function node, e.g., a write node, etc., may also be used. As FIG. 6A indicates, this function node requires a task specification as input, labeled "DAQmx task", and so in one embodiment, the first node, or alternatively, the graphical program execution system responsible for executing the graphical program, may determine whether a task specification has already been created, and if not, may create the task specification, and include the channel specification in the task specification. The first node may then provide the task specification (including the channel specification) to the function node as input. Thus, although in the example program of FIG. 6A the analyzing, generating, and providing are invoked or performed by the first node, in various embodiments, the analyzing, generating, and providing may be invoked or performed by a graphical program execution system, and/or by one (or more) of the plurality of nodes comprised in the graphical program.

Note that in this embodiment, the process of creating a task specification, e.g., the DAQmx task specification, is an implicit operation that the method performs for the user. For example, in one embodiment, the plurality of interconnected nodes of the graphical program includes a channel creation node (or its equivalent) operable to generate a channel specification for a physical channel, where the channel specification is operable to configure a physical channel of a device for use in performing the task. In generating the channel specification, the channel creation node may be operable to receive input indicating the physical channel of the device, as shown in FIG. 6A by the icon or node labeled "physical channel(s): I/O Dev1/ai0". Similarly, in one embodiment, in generating the channel specification, the channel creation node may be operable to receive input indicating a channel name for the channel specification, as shown in FIG. 6A by the icon or node labeled "MyChannel: name to assign" coupled to the "DAQmx Create Virtual Channel.vi" node. In a preferred embodiment, in generating a channel specification, the channel creation node may be further operable to programmatically generate the task specification and provide the task specification to the function node, where the task specification includes the channel specification.

In some graphical programs, an explicit "create task" node may be included, as shown in FIG. 6B. More specifically, FIG. 6B illustrates an example graphical program with explicit nodes that would be required if the techniques of the present invention were not used. In other words, the graphical program of FIG. 6B presents an explicit illustration of the functionality that is included implicitly in the graphical program of FIG. 6A.

As FIG. 6B shows, a create task node, labeled "DAQmx Create Task.vi" operates to create a task specification, although it should be noted that the created task specification is substantially empty, e.g., is an "unfilled" data structure operable to contain specification information for a task. As shown, this create task node provides the created task specification to the "DAQmx Create Virtual Channel.vi" node as input, which then adds channel specification information to the task specification and provides the task specification to the function node, "DAQmx Read.vi".

As FIG. 6B also shows, the graphical program includes a task cleanup node, labeled "DAQmx Clear Task.vi" coupled to the function node. This node may perform various cleanup operations once performance of the task is completed, such as, for example, deleting files and/or data structures, "releasing" resources, e.g., a DAQ device, for use by other programs or systems, etc.

Note the symmetrical inclusion of this explicit cleanup node (in FIG. 6B) corresponding to the explicit task creation node. Referring back to FIG. 6A, in one embodiment, there is a similar symmetry in that, corresponding to the implicit task creation functionality provided, the graphical program may include a corresponding implicit task cleanup functionality, thus obviating the inclusion of an explicit task cleanup node. Note that the graphical program of FIG. 6B produces the same result as the graphical program of FIG. 6A. The only difference is that in the program of FIG. 6B, the task (specification) is named "MyTask". In the example of FIG. 6A, the task (specification) is un-named.

FIG. 7 illustrates an embodiment of a graphical program that implements and uses the techniques described above with reference to FIG. 5 in a different manner. More specifically, in the embodiment of FIG. 7, a global virtual channel, in this case a voltage channel named "MyChannel", may be configured, for example using a configuration tool such as DAQ Assistant provided by National Instruments Corporation. The virtual channel (actually, a channel specification) may then be used in LabVIEW as if it were a task (specification). This diagram produces the same results as the graphical programs of FIGS. 6A and 6B, described above.

As FIG. 7 shows, this graphical program includes a first node, referred to as a channel name control (I/O MyChannel), coupled to the function node "DAQmx Read.vi". In one embodiment, the first node is operable to provide a channel specification to the function node as input. For example, in one embodiment, the first node includes a reference to the channel specification, whereby the channel specification may be retrieved for use by other nodes, e.g., the function node.

However, as noted above, the function node requires a task specification as input. Thus, in one embodiment, the analysis of 502 may determine that a data type mismatch occurs between the output of the channel name control (data type: channel specification) and the input of the function node (data type: task specification). In one embodiment, the task specification generation of 504 may be performed by programmatically "promoting" the channel specification to a task specification, where the task specification includes the channel specification. In other words, analogous to other standard data type promotions, such as integer-to-double, float-to-double, etc., as is well known in the art of programming and data processing, the data type "channel specification" may be promoted to the data type "task specification", thereby converting the channel specification to a corresponding task specification, where, as noted above, the task specification includes the channel specification. Thus, by converting or promoting the channel specification to a task specification, the task specification is created implicitly.

In the embodiment of FIG. 7, the analyzing, generating, and providing are invoked or performed by the graphical program execution system, although as noted above, in various embodiments, the analyzing, generating, and providing may be invoked or performed by the graphical program execution system, and/or by one (or more) of the plurality of nodes comprised in the graphical program. Thus, in various embodiments, this programmatic creation of the task specification via promotion or conversion, (including the determination of the need to perform the promotion or conversion) may be performed by the graphical program execution system (i.e., by infrastructure code), by program code included or associated with one or more of the nodes, i.e., the function node or the channel name control, or by a combination of the two.

Thus, in one embodiment, the plurality of interconnected nodes of the graphical program includes a channel name control (or its equivalent), where the channel name control includes a reference to a channel specification, and where the channel specification includes channel configuration data for configuring a physical channel of a device for use in performing the task, and where the channel name control may be operable to provide the channel specification to the function node as input. In generating the task specification in response to the analyzing (of FIG. 5, described above), the channel specification may be programmatically converted to the task specification, where the task specification includes the channel specification.

Note that the channel name control is just one example of a node contemplated for use with or by the methods described herein, and that the implicit task creation, e.g., via data type promotion, may also be associated with other types of nodes. For example, in an alternate embodiment, a "timing and triggering" node may provide a timing and triggering specification as output. In this embodiment, the timing and triggering specification may be promoted or converted to a task specification, where the task specification includes the timing and triggering specification. In one embodiment, the generated task specification may include a default channel specification, e.g., device 1, analog input 0 (I/Odev1/ai0).

Thus, in a broad sense, the system and method may operate to implicitly generate the task specification by promoting or converting a different data type or structure, e.g., a channel specification, or other type of specification, to the task specification.

Thus, in preferred embodiments of the inventions, an explicit task specification creation node, e.g., "DAQmx Create Task.vi", is not required because the task specification is created implicitly. Recall also that the task specification preferably adds timing and triggering information to a collection of one or more DAQmx channel specifications. When the task specification is implicitly created, default timing (one sample, acquired imunediately), and default triggering (none) are preferably included. Of course, the default values may be over-ridden with other values as desired.

It should be noted that the task to be performed by the graphical program may include any type of functionality desired, including, for example, an industrial automation function, a process control function, a test and measurement function, and/or a simulation function, among others. As noted above, the graphical program may operate to perform the task in conjunction with one or more devices, e.g., DAQ devices, motion controllers, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-accessible memory medium configured with program instructions for programmatic creation of a task specification in a graphical program, wherein the program instructions are executable by a processor to perform:

analyzing a graphical program, wherein the graphical program implements a task, wherein the graphical program comprises a plurality of interconnected nodes that visually indicate functionality of the graphical program, including a function node that requires a task specification as input, wherein the task specification comprises hardware and/or software specifications for performing the task, and wherein said analyzing determines that the task specification needs to be created, including:

determining that the function node requires the task specification as input; and determining that the graphical program does not include task creation code for creating the task specification;

generating the task specification in response to said analyzing; and providing the task specification to the function node as input, wherein the function node is operable to execute in accordance with the generated task specification to perform at least a portion of the task.

2. The memory medium of claim 1, wherein said analyzing, said generating, and said providing occur at run-time of the graphical program.

3. The memory medium of claim 1, wherein said determining that the graphical program does not include task creation code for creating the task specification comprises:

determining that the graphical program does not include a task creation node for creating the task specification.

4. The memory medium of claim 1, wherein the task specification comprises a data structure that stores the hardware and/or software specifications for the task.

5. The memory medium of claim 1, wherein the plurality of interconnected nodes comprises a channel creation node operable to generate a channel specification for a physical channel, wherein the channel specification is operable to configure a physical channel of a device for use in performing the task.

6. The memory medium of claim 5, wherein, in generating the channel specification, the channel creation node is further operable to perform said generating the task specification and said providing the task specification to the function node, wherein the task specification includes the channel specification.

7. The memory medium of claim 5, wherein, in generating the channel specification, the channel creation node is further operable to receive input indicating the physical channel of the device.

8. The memory medium of claim 5, wherein, in generating the channel specification, the channel, creation node is further operable to receive input indicating a channel name for the channel specification.

9. The memory medium of claim 1, wherein the plurality of interconnected nodes comprises a channel name control, wherein the channel name control comprises a reference to a channel specification, wherein the channel specification comprises channel configuration data for configuring a physical channel of a device for use in performing the task;

wherein the channel name control is operable to provide the channel specification to the function node as input; and wherein, in generating the task specification in response to said analyzing, the program instructions are further executable to perform:
   automatically converting the channel specification to the task specification, wherein the task specification includes the channel specification.

10. The memory medium of claim 1,
   wherein the plurality of interconnected nodes comprises a first node, wherein the first node operates to provide a first specification, wherein the first specification comprises configuration data for configuring hardware and/or software for use in performing the task;
   wherein the first node is operable to provide the first specification to the function node as input; and
   wherein, in generating the task specification in response to said analyzing, the program instructions are further executable to perform:
      automatically converting the first specification to the task specification, wherein the task specification includes the first specification.

11. The memory medium of claim 1, wherein the program instructions are further executable to perform:
   executing the graphical program to perform the task in accordance with the generated task specification.

12. The memory of claim 11, wherein said executing the graphical program to perform the task in accordance with the generated task specification comprises:
   the function node receiving the generated task specification; and
   executing the function node in accordance with the received task specification.

13. The memory medium of claim 11, wherein the program instructions are further executable to automatically perform one or more cleanup operations upon completion of the task.

14. The memory medium of claim 13, wherein the one or more cleanup operations comprise one or more of:
   closing one or more files used in performing the task;
   deleting one or more files used in performing the task;
   deleting one or more data structures used in performing the task;
   re-configuring hardware used in performing the task; and
   re-configuring software used in performing the task.

15. The memory medium of claim 13,
   wherein the graphical program comprises a block diagram portion and a user interface portion.

16. The memory medium of claim 15,
   wherein, during execution of the graphical program, the graphical user interface is displayed on a display of a first computer system and the block diagram executes on a second computer system.

17. The memory medium of claim 1, wherein the function node comprises one or more of:
   a read node for acquiring data from an external system or process; and
   a write node for writing data to the external system or process.

18. The memory medium of claim 1, wherein, in generating the task specification, the program instructions are further executable to provide default timing and/or triggering attributes for the task specification.

19. The memory medium of claim 1,
   wherein the graphical program comprises a graphical data flow program.

20. The memory medium of claim 1, wherein the task comprises one or more of:
   an industrial automation function;
   a process control function;
   a test and measurement function; and
   a simulation function.

21. The memory medium of claim 1, wherein performance of said analyzing, said generating, and said providing is invoked by one or more of:
   a graphical program execution system; and
   one of the plurality of nodes comprised in the graphical program.

22. A method for programmatic creation of a task specification in a graphical program, the method comprising:
   automatically analyzing a graphical program, wherein the graphical program implements a task, wherein the graphical program comprises a plurality of interconnected nodes that visually indicate functionality of the graphical program, including a function node that requires a task specification as input, wherein the task specification comprises hardware and/or software specifications for performing the task, and wherein said analyzing determines that the task specification needs to be created, including:
      determining that the function node requires the task specification as input; and
      determining that the graphical program does not include task creation code for creating the task specification;
   automatically generating the task specification in response to said analyzing; and
   automatically providing the task specification to the function node as input, wherein the function node is operable to execute in accordance with the generated task specification to perform at least a portion of the task.

23. A system for automatic creation of a task specification in a graphical program, the system comprising:
   a processor; and
   a memory medium coupled to the processor, wherein the memory medium stores a graphical program and program instructions which are executable to:
      analyze the graphical program, wherein the graphical program implements a task, wherein the graphical program comprises a plurality of interconnected nodes that visually indicate functionality of the graphical program, including a function node that requires a task specification as input, wherein the task specification comprises hardware and/or software specifications for performing the task, and wherein said analyzing determines that the task specification needs to be created, including:
         determining that the function node requires the task specification as input; and
         determining that the graphical program does not include task creation code for creating the task specification;
      generate the task specification in response to said analyzing; and
      provide the task specification to the function node as input, wherein the function node is operable to execute in accordance with the generated task specification to perform at least a portion of the task.

24. A system for automatic creation of a task specification in a graphical program, the system comprising:
   means for automatically analyzing a graphical program, wherein the graphical program implements a task, wherein the graphical program comprises a plurality of interconnected nodes that visually indicate functionality of the graphical program, including a function node that requires a task specification as input, wherein the task specification comprises hardware and/or software specifications for performing the task, and wherein said analyzing determines that the task specification needs to be created, including:

determining that the function node requires the task specification as input; and determining that the graphical program does not include task creation code for creating the task specification;

means for automatically generating the task specification in response to said analyzing; and means for automatically providing the task specification to the function node as input, wherein the function node is operable to execute in accordance with the generated task specification to perform at least a portion of the task.

* * * * *

UNITED STATES PATENT AND TRADEMARK OFFICE
CERTIFICATE OF CORRECTION

PATENT NO. : 7,647,578 B2
APPLICATION NO. : 10/438781
DATED : January 12, 2010
INVENTOR(S) : Murphy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1729 days.

Signed and Sealed this

Sixteenth Day of November, 2010

David J. Kappos
*Director of the United States Patent and Trademark Office*